United States Patent Office 3,561,970
Patented Feb. 9, 1971

3,561,970
PHOTOGRAPHIC MATERIALS FOR THE SILVER-DYE-BLEACH PROCESS
Walter Püschel, Leverkusen, Paul Marx, Cologne-Buchheim, and Karl-Wilhelm Schranz, Opladen, Germany, and Jan Jaeken, Hove, Belgium, assignors to Agfa-Gevaert Aktiengesellschaft, Leverkusen, Germany, a corporation of Germany
No Drawing. Filed Nov. 22, 1966, Ser. No. 596,103
Claims priority, application Germany, Dec. 3, 1965,
A 50,966
Int. Cl. G03c 1/10
U.S. Cl. 96—99  3 Claims

ABSTRACT OF THE DISCLOSURE

Certain azo dyes or their mesomeric azine dyes are particularly suited as silver-dye-bleach dyes. The light-sensitive emulsion used to carry the dyes can contain the dyes themselves or one or more components that will react to form the dyes subsequently, as during the processing.

---

The invention relates to photographic materials for the silver dye bleach process, which materials contain certain azo dyes or their mesomeric azine dyes, these dyes having excellent spectral properties and high brilliance.

It is known that color photographic images can be produced by the silver-dye-bleach process, wherein a dye, usually an azo dye, is bleached in a homogeneously dyed colloid layer in accordance with a silver image which has been produced photographically.

According to this process, it is possible to produce both negatives and reversal images. If it is desired to produce positive paper prints or duplicate positives from diapositives, the silver image is produced by means of a simple black-and-white development, this silver image representing a negative of the copying original. Since the image dye which is homogeneously distributed in the layer (or in the 3 layers of a multicolor material) is bleached proportionately to the silver image, a dye image is obtained, which is positive with respect to the original. If a silver image is produced which is positive with respect to the original, for example, by a black-and-white reversal development or by the bromide ion diffusion method or silver salt diffusion method, then after the color bleaching a dye image is formed which is opposite in gradation to the original that is to say a positive color image is formed if the original is a negative color image.

The standards set as regards dyes for the process described are particularly high, since these dyes must be spectrally suitable, and should also be easily bleachable and fast to light. Furthermore, they must not detrimentally affect the photographic emulsion and must be completely resistant to diffusion in the gelatin, which is almost exclusively used as layer former. It is particularly important to have a high degree of fastness to light, and resistance to acid gases, such as occur, for example, in industrial atmospheres.

It has now been found that azo dyes or their mesomeric azine dyes of the following general formulae are especially suitable for this purpose:

$$R-A-N=N-B$$

(or its mesomeric azine form $$R-A=N-N=B)$$

wherein: A=(I) aryl such as phenylene or naphthylene, (II) a 5-membered or 6 membered heterocyclic ring with preferably nitrogen as a heterocyclic ring member, such as pyrazolone or thiazole; the above groupings particularly the phenyl rings can in turn be substituted, for example, with halogen such as chlorine or bromine, alkyl such as methyl or ethyl with preferably up to 5 carbon atoms, hydroxy, alkoxy having up to 5 carbon atoms such as methoxy or ethoxy, carboxyl, esterified carboxy, amino, acylamino preferably such as acetylamino or stearoyl-amino, alkylamino, sulfo, aminosulfonyl, esterified sulfo groups, alkylsulfonyl or the like; or (III) a grouping of the formula:

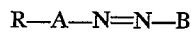

in which $R_3$ stands for an aliphatic radical such as alkyl, or aromatic radical such as phenyl, which can be substituted with the aforementioned substituents, and $R_4$ represents an electro-negative group which activates methylene groups, such as nitrile, $>CO$ or $>CS$; $R=$hydroxyl, $-NH-SO_2-R_7$ or

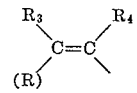

wherein $R_7$ represents alkyl with up to 8 carbon atoms, aryl such as phenyl or naphthyl or aralkyl such as benzyl or phenyl alkyl such as phenylethyl; $R_5$ and $R_6$ stand for hydrogen, alkyl with up to 20 carbon atoms, aryl, more especially phenyl or naphthyl, aralkyl such as benzyl or phenyl alkyl such as phenyl-ethyl or for a 5-membered or 6-membered heterocycilc ring such as pyridinyl or quinolinyl; these groups can be substituted in the manner indicated above; or the substituents $R_5$ and $R_6$ can represent the ring members necessary to complete a heterocyclic ring, preferably a saturated ring, such as, for example, morpholine, piperidine, pyrrolidine, or piperazine; B=represents a grouping of the formula

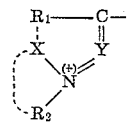

(or its mesomeric form

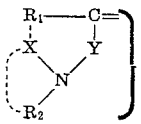

wherein Y represents a chemical linkage, a vinylene grouping, an azomethine grouping or a phenylene preferably a 1,2-phenylene group; in the case of the first-mentioned formula, Y is to be appropriately changed according to the bond displacements caused by the mesomerism, e.g. —CH=CH—↔=CH—CH=, etc. X=alkyl, such as methyl, ethyl, butyl, hexyl, palmityl or stearyl, olefinically unsaturated alkyl such as allyl, aryl, preferably phenyl or naphthyl, aralkyl such as benzyl or phenyl alkyl such as phenylethyl or a 5- or 6-membered cycloalkyl such as cyclohexyl; the above groups, particularly the phenyl radicals, can be substituted, for example, with halogen such as chlorine or bromine, alkyl such as methyl or ethyl with preferably up to 5 carbon atoms, hydroxy, alkoxy having preferably up to 5 carbon atoms, such as methoxy, ethoxy, carboxyl, esterified carboxy, amino, acylamino the acyl groups being preferably derived from an aliphatic carboxylic acid having up to 18 carbon atoms such as acetylamino or stearoylamino, alkylamino, sulfo, aminosulfonyl, esterified sulfo groups, alkylsulfonyl or the like; $R_1$=hydrogen, alkyl with up to 20 carbon atoms, such as methyl, ethyl, butyl, stearyl, olefinically unsaturated alkyl, such as allyl, 5- or 6-membered cycloalkyl such as cyclohexyl, aryl, preferably phenyl or naphthyl, or aralkyl such as benzyl or phenyl alkyl such as phenyl ethyl; $R_2$=hydrogen, alkyl with up to 20 carbon atoms, such as methyl, ethyl, butyl, stearyl, olefinically unsaturated alkyl, such as allyl, 5- or 6-membered cycloalkyl such as cyclohexyl, aryl, preferably phenyl or naphthyl, or aralkyl such as benzyl or phenylethyl, it being possible for the above groups and particularly the phenyl radicals to be substituted, for example, with halogen such as chlorine or bromine, alkyl such as methyl or ethyl with advantageously up to 5 carbon atoms, hydroxy, alkoxy having preferably up to 5 carbon atoms such as methoxy, ethoxy, carboxyl, esterified carboxy, amino, acylamino, the acyl groups being preferably derived from an aliphatic carboxylic acid having up to 18 carbon atoms such as acetylamino or stearylamino, alkylamino, sulfo, aminosulfonyl, esterisulfo groups, alkylsulfonyl or the like; preferred are substituents which render the dyes fast to diffusion or soluble in water; X and $R_1$ and/or X and $R_2$ together can in addition represent the methylene or methine groups or hetero atoms such as —O—, —S—, —Se— or >N— which are necessary for completing a simple or fused 5-membered or 6-membered heterocyclic ring; the combination X+$R_1$ can, for example, represent the ring members necessary for completing the following heterocyclic rings: oxazole, benzoxazole, thiazole, benzthiazole, selenazole, benzselenazole, imidazole, benzimidazole, pyrrolidone, quinoline, piperidine, pyrimidine; the combination X+$R_2$ can represent the ring members necessary for completing the following heterocyclic rings: piperidine, morpholine, pyrazole, pyrazoline, pyrrolidine and oxazolidine.

The phenyl or naphthyl rings and heterocyclic compounds of the general formula can, as already indicated, be substituted in any desired manner. Generally suitable substituents include halogen such as chlorine or bromine, alkyl or alkoxy with up to 20 carbon atoms, carboxyl, carboxyl esterified with preferably aliphatic alcohols up to 20 carbon atoms, sulfo, sulfonamide or carbonamide, it being possible for the amide groups to be substituted with alkyl radicals with up to 20 carbon atoms or acyl radicals, more especially those which are derived from aliphatic carboxylic acids with up to 20 carbon atoms, as well as nitro, nitrile or amino groups. The amino group can in its turn be substituted with alkyl with up to 20 carbon atoms, acyl preferably acyl which is derived from aliphatic carboxylic acids with up to 20 carbon atoms or phenyl; the aromatic or heterocyclic radical of the above formula can furthermore be substituted by further phenyl or also naphthyl rings or can contain the latter in anellated form.

Also the substituents on the phenylene ring of the above formula can in their turn be substituted, so that numerous possibilities of variation are provided, and certain properties such as solubility or the colour of the dyes can be modified as desired. Upon selection of the substituent, it is merely necessary to ensure that the resulting products do not have any negative influence on the photographic properties of the material, and, under the usual photographic processing conditions, do not react with developers or their oxidation products or at most only with the formation of colourless products.

The mesomerism between the azo and azine form which occurs with the dyes to be used for the inventive material is explained in the following equations:

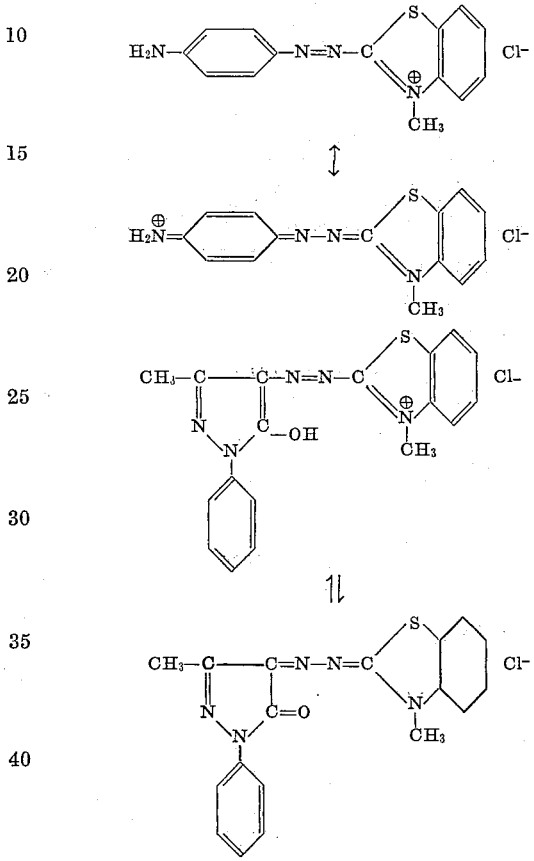

The following dyes have proved to be especially suitable:

TABLE I

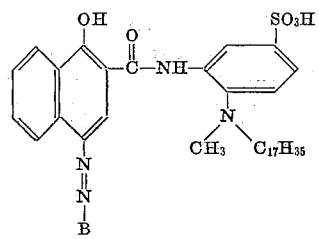

B represents:

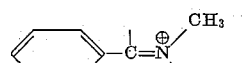  orange

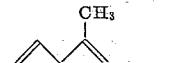

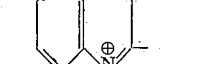  magenta

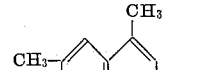  magenta

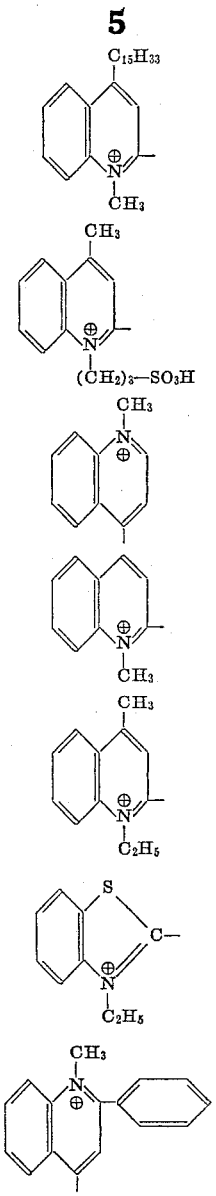
magenta
magenta
blue
magenta
magenta
magenta
TABLE II
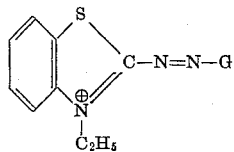
where G represents:
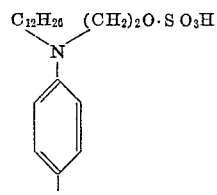
blue
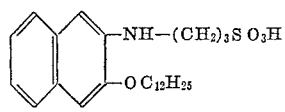
magenta
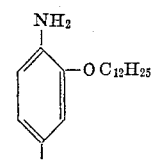
magenta
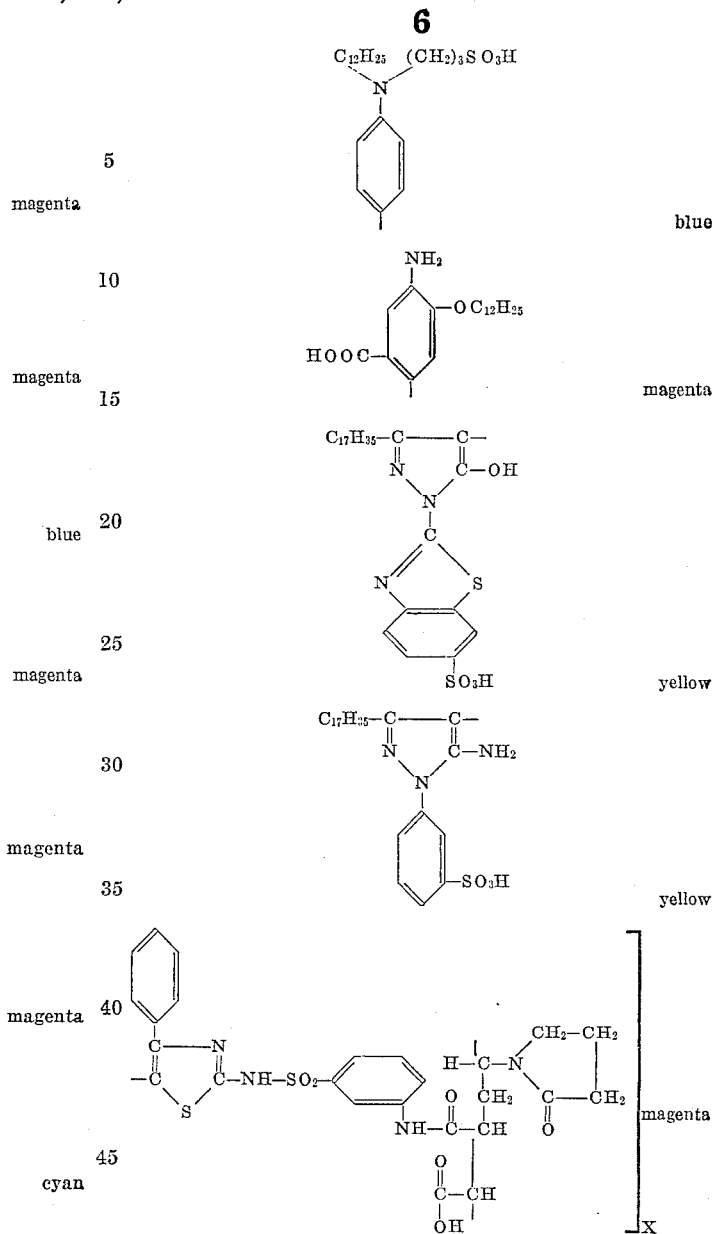
blue
magenta
yellow
yellow
magenta
cyan
TABLE III
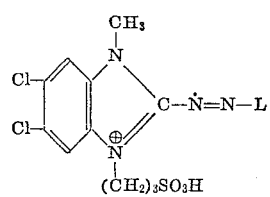
where L represents:
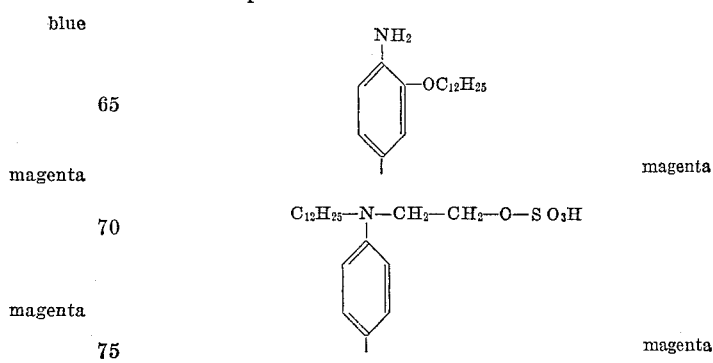
magenta
magenta

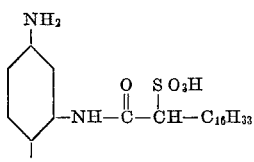

magenta

The above dyes and methods for the prepartion thereof have been frequently described in the literature. A comprehensive illustration thereof is found in the publication by Hünig, "Angewandte Chemie," vol. 70 (1958), pp. 215 et seq and in later publications, see Liebig's Annalen, vol. 651 (1962), pp. 89 et seq. Other literature references are found in the latter.

Because of their excellent properties, the dyes according to the invention can be used in various ways in color photographic layers for the silver dye bleach process. As shown in the following examples, they are used preferably as image dyes in layers which are subjected to a simple black-and-white negative development and thus lead to direct positive dye images in the subsequent dye bleaching bath. However, one could equally well perform a black-and-white reversal development, and after passing the film through the treatment baths of the silver dye bleach process, dye images are obtained which have a characteristic curve opposite to that of the original such as required for the production of positive colored prints or transparencies starting from a color negative.

The dyes mentioned above are largely inert to the usual quantities of emulsion additives such as optical or chemical sensitizers, stabilizers, plasticizers, wetting agents, hardening agents and other substances.

As will be shown in the examples given below, they can be bleached to pure whites in different types of bleaching baths, e.g., those based on quinoline and iodide (as described in U.S. Pat. No. 2,629,568, Example $a$29) or those based on thiourea (as in British Pat. No. 507,211) and with the use of different bleaching catalysts such as quinoxalines, phenazine derivatives and the like.

The dyes to be used according to the invention can be added to all types of silver halide emulsions such as silver chloride, silver bromide, silver chlorobromide or emulsions which contain a small amount of, for example, up to 10 mole percent of silver iodide.

Color photographic layers containing the azo dyes of the present invention can be applied onto any support such as paper, baryta-coated paper, polyethylene coated paper or paper which has in some other way been rendered hydrophobic, glass, metallized foils of all types, cellulose acetates, in particular cellulose triacetate, in transparent or white pigmented form. They can also be cast on backed, transparent or pigmented foils of polyesters, especially polyethylene terephthalate, polycarbonates and other polyesters.

In accordance with another embodiment of the present invention, only one component for the production of the azo dyes is incorporated in the light-sensitive silver halide emulsion layer and the azo dye is then produced by treating such a layer under suitable conditions with a solution of the other component. It is likewise possible to incorporate both components for the required azo dye into the light-sensitive layer. The layer is then treated with a suitable bath in order to cause the reaction of the two components to form the azo dye. The processing of the light-sensitive layer must be conducted in such a way that the photographic properties of the layer are not deleteriously effected. The preparation of the dye can be performed before or after exposure of the light-sensitive layer or even after development of the exposed layer. The advantages of this embodiment of the invention lies in the particularly fine distribution of the dye formed in the light-sensitive layer.

EXAMPLE 1

1.4 g. of the hydrazone of the following formula:

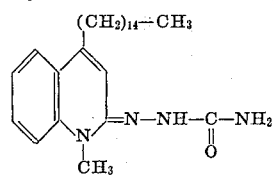

are incorporated, together wtih 1.3 g. of a compound of the following formula:

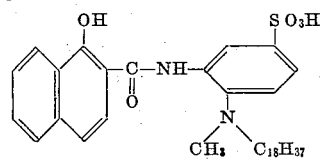

in 100 cc. of a gelatine-silver bromide emulsion and applied to a suitable support, e.g. acetylcellulose.

In the dried layer, the dye of the formula given below is produced by rinsing in a 10% potassium ferricyanide solution, the pH value of which has been adjusted to 7.5.

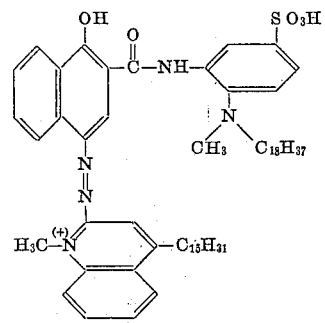

The layer is then dried, whereafter it is exposed and further processed as follows.

(1) Development for 5 minutes at 20° C. in a developer of the following composition:

1 g. of p-methylamino phenol
10 g. of hydroquinone
10 g. of sodium sulfite
12 g. of soda, anhydrous
1 g. of potassium bromide
1 litre of water.

(2) Rinsed for 5 minutes.
(3) Fixed for 5 minutes in a solution of 200 g. of sodium triosulfate in 1 litre of water.
(4) Rinsed for 5 minutes.
(5) Dye-bleached for 15 minutes in the following solution:

50 cc. of ethanol
50 g. of thiourea
20 mg. of quinoxaline
910 cc. of water
5 cc. of concentrated sulfuric acid.

(6) Rinsed for 5 minutes
(7) Bleach-fixed for 10 minutes in a bleach-fixing bath of the following composition:

26 g. of tetrasodium-ethylenediamine-tetraacetate
24 g. of soda, anhydrous
15 g. of ferricchloride, crystals
13 g. of sodium sulfite, dry
200 g. of sodium thiosulfate in
500 ml. of water.

(8) Rinsed for 20 minutes.

A magenta-colored direct positive image is obtained. It will readily be understood that bleaching baths of a different composition are also suitable for the process, for example:

200 ml. of 10% aqueous solution of potassium iodide
10 g. of sodium hypophosfite
90 ml. of quinoline
22 mg. of quinoxaline and
300 ml. of 5 N-hydrochloric acid in
400 ml. of water.

EXAMPLE 2

To 100 cc. of a silver bromide gelatine emulsion are added an aqueous alkali solution of 1.5 g. of a dye of the following formula:

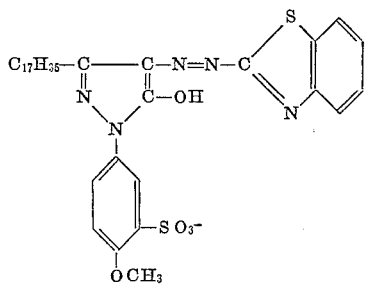

The emulsion thus prepared is applied onto a support, e.g. of cellulose acetate. The photographic layer obtained is exposed and processed in accordance with Example 1. A yellow, direct positive image is obtained.

The dye of the indicated formula is prepared as follows:

17 g. of 1-(4-methoxy - 3 - sulphophenyl) - 3 - heptadecyl - 5 - pyrazolone are dissolved in 1 litre of a 3% soda solution 18 g. of potassium persulfate are added and the solution thus formed has added thereto another solution of 6.5 g. of N-ethyl-benzthiazolone hydrazone in a 50 cc. of methanol. Temperature: 20° C., time for addition 2 minutes. Stirring is continued for 1 hour and semi-concentrated hydrochloric acid is then added until the pH value has fallen below 2. After 30 minutes, the solution is suction-filtered, the solids so recovered washed twice with water and dried in vacuo. Yield: 22 g.

EXAMPLE 3

1.4 g. of the hydrazone of the following formula:

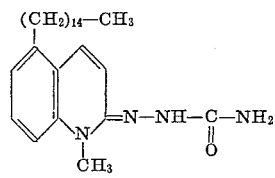

are incorporated, together with 1.3 g. of a compound of the following formula:

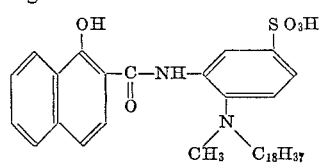

in 100 cc. of a gelatine-silver bromide emulsion and applied to a suitable support, e.g. acetylcellulose.

The dried layer is imagewise exposed and the exposed layer developed in the developer bath of Example 1.

The thus developed layer is fixed with a 20% aqueous solution of sodium thiosulfate and—after rinsing—treated for two minutes at a temperature of 20° C. with an oxidising bath of the following composition:

30 g. of potassium persulfate
10 g. of potassium ferricyanide
1 l. of water.

Thereafter the pH of the layer is adjusted to a value of 7 by treatment with an aqueous sodium carbonate solution. Subsequent dye-bleaching and bleach-fixing of the silver image is accomplished as described in Example 1.

The composition of the oxidising bath can be modified according to the requirements of the special photographic material. The only condition which has to be met is that the silver image produced upon development must not be bleached.

A magenta direct positive image is obtained.

What is claimed is:

1. Light-sensitive photographic material with at least one silver halide emulsion layer containing an azo dye which in one mesomeric form has the formula:

$$R\text{---}A\text{---}N=N\text{---}B$$

wherein:
A = a bivalent radical of the phenylene or naphthylene series or a bivalent heterocyclic ring selected of the group consisting of pyrazole and thiazole;
R = hydroxy,

or $\text{---}NH\text{---}SO_2\text{---}R_7$;
$R_5$ and $R_6$ = hydrogen, alkyl with up to 20 carbon atoms;
$R_7$ = alkyl with up to 8 carbon atoms or a radical of the phenyl series;
B = a benzthiazolyl, benzimidazolyl or quinolyl or the group of the following formula

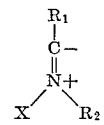

in which:
$R_1$ = a radical of the phenyl or naphthyl series;
$R_2$ = alkyl with up to 20 carbon atoms;
X = alkyl with up to 18 carbon atoms.

2. In the process for the production of a silver-dye-bleach photographic dye image the improvement according to which the silver-dye-bleach dye is an azo or an azine dye which in one mesomeric form has the formula:

$$R\text{---}A\text{---}N=N\text{---}B$$

wherein:
A = a bivalent radical of the phenylene or naphthylene series or a bivalent heterocyclic ring selected of the group consisting of pyrazole and thiazole;
R = hydroxy,

or $\text{---}NH\text{---}SO_2\text{---}R_7$;
$R_5$ and $R_6$ = hydrogen, alkyl with up to 20 carbon atoms;
$R_7$ = alkyl with up to 8 carbon atoms or a radical of the phenyl series;
B = a benzthiazolyl, benzimidazolyl, or quinolyl group or the group of the following formula:

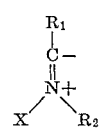

in which:
$R_1$ = a radical of the phenyl or naphthyl series;
$R_2$ = alkyl with up to 20 carbon atoms;
X = alkyl with up to 18 carbon atoms.

3. A process for the production of photographic dye images including the step of
exposing to light a supported light-sensitive silver halide emulsion layer containing uniformly distributed therein the components for the production of a dye which in one mesomeric form has the formula:

R—A—N=N—B wherein:
A = a bivalent radical of the phenylene or naphthylene series or a bivalent heterocyclic ring selected of the group consisting of pyrazole and thiazole;
R = hydroxy,

or —NH—SO$_2$—R$_7$;
R$_5$ and R$_6$ = hydrogen, alkyl with up to 20 carbon atoms;
R$_7$ = alkyl with up to 8 carbon atoms or a radical of the phenyl series;
B = a benzthiazolyl, benzimidazolyl, or quinoyl group or the group of the following formula:

in which:
R$_1$ = a radical of the phenyl or naphthyl series;
R$_2$ = alkyl with up to 20 carbon atoms;
X = alkyl with up to 18 carbon atoms;
and then suitably processing the layer by development, dye-bleaching and fixing to obtain an image.

References Cited

FOREIGN PATENTS 782,310  9/1957  Great Britain _____ 8—46

OTHER REFERENCES

Cornwell-Clyne: "Colour Cinematography," p. 420, Chapman & Hall, Ltd., London (1936).

Glauert et al.: Journal Chemical Society, pp. 3742-6 (1953).

Hunig et al.: Angewandte Chemie, vol. 70, pp. 215-222 (1958).

J. TRAVIS BROWN, Primary Examiner

U.S. Cl. X.R.

96—53